Dec. 7, 1948.   J. A. MAUL ET AL   2,455,870
COUPLING
Filed Jan. 5, 1944
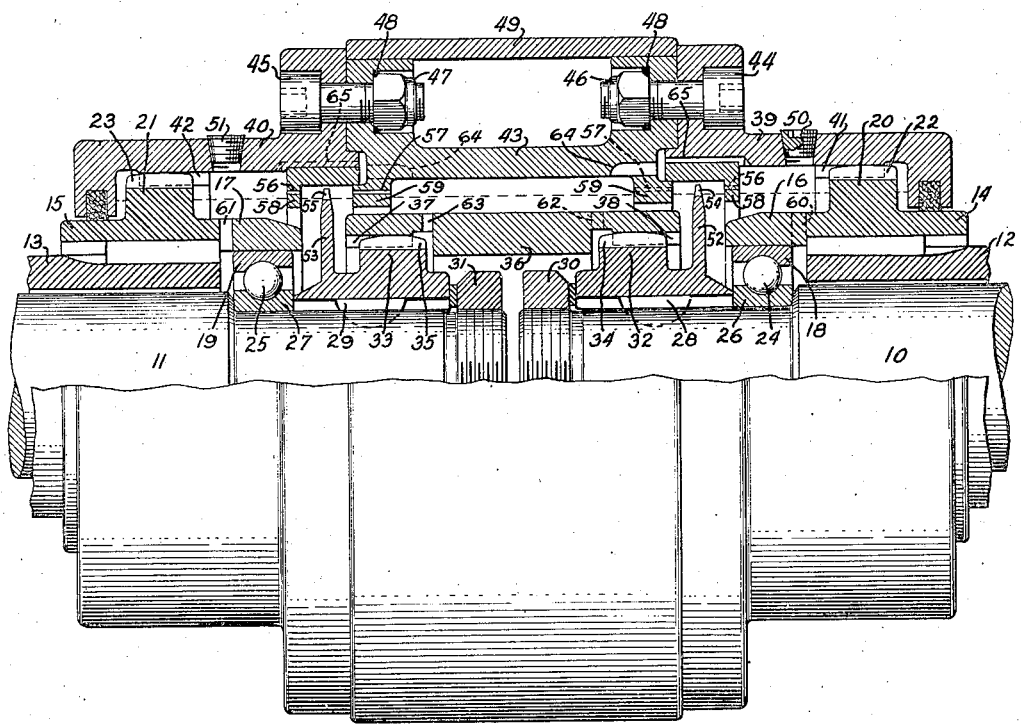
Inventors:
John A. Maul,
Willis P. Lautzenheiser,
by Harry E. Dunham
Their Attorney.

Patented Dec. 7, 1948

2,455,870

UNITED STATES PATENT OFFICE 2,455,870

COUPLING

John A. Maul and Willis P. Lautzenheiser, Fort Wayne, Ind., assignors to General Electric Company, a corporation of New York Application January 5, 1944, Serial No. 517,078

9 Claims. (Cl. 64—9)

Our invention relates to couplings for concentric shafts and especially to the type coupling which is adapted to secure together oppositely extending pairs of oppositely rotating shafts.

An object of our invention is to provide an improved coupling for connecting together substantially coaxially extending shafts.

Another object of our invention is to provide an improved coupling for connecting together oppositely extending pairs of oppositely rotating shafts which are supported one within the other by bearings and to provide an improved arrangement for lubricating the bearings.

Further objects and advantages of our invention will become apparent and our invention will be better understood from the following description referring to the accompanying drawing, and the features of novelty which characterize our invention will be pointed out with particularity in the claims annexed to and forming part of this specification.

The drawing is a side elevational view, partly in section, illustrating an embodiment of our improved coupling construction.

Referring to the drawing, we have shown a coupling for connecting together a plurality of substantially coaxial shafts extending in one direction to a plurality of substantially coaxial shafts extending in the opposite direction. These shafts include inner substantially coaxial solid shafts 10 and 11 and outer or quill shafts 12 and 13 arranged about the inner shafts 10 and 11. The adjacent ends of the outer shafts 12 and 13 are provided with externally splined engagement members 14 and 15 which are secured to the shafts and extend beyond the adjacent ends of the shafts to provide supporting flanges 16 and 17 within which the outer races 18 and 19, respectively, of anti-friction bearings are secured. The engagement or coupling members 14 and 15 are formed with outwardly extending flanges 20 and 21, the outer periphery of each of which is externally splined at 22 and 23. In the illustrated arrangement, the antifriction bearings are shown as ball bearings 24 and 25 which are provided with inner races 26 and 27 arranged about the inner shafts 10 and 11, so as to support these shafts on the outer quill shafts 12 and 13 through the engagement members 14 and 15, respectively. The antifriction bearings are held in position by externally splined engagement coupling members 28 and 29 which are mounted on the shafts 10 and 11 and are secured in position by nuts 30 and 31 which threadedly engaged the outer threaded ends of the shafts 10 and 11, respectively. The engagement members 28 and 29 are formed with outwardly extending flanges 32 and 33, the outer periphery of each of which is externally splined at 34 and 35.

Corresponding shafts of each plurality of shafts are adapted to be connected together by the arrangement of internally splined coupling members arranged in engagement with the externally splined engagement members. An internally splined coupling 36 is formed with internally splined ends at 37 and 38 arranged in engagement with the externally splined flanges 32 and 33 to provide a driving connection therebetween. The outer shafts 12 and 13 are mechanically connected together by another internally splined coupling members which is arranged about the first-mentioned coupling member 36 and includes a pair of cup-shaped members 39 and 40 which are formed with internal splines 41 and 42 arranged in splined engagement with the external splines of the flanges 20 and 21, respectively. These two cup-shaped members are secured together and to a central arbor 43 by a plurality of Allen-head bolts 44 and 45 which threadedly engage nuts 46 and 47 which are tack welded at 48 to the arbor 43. In order to minimize windage and noise, a wrapper plate or housing 49 is arranged about the arbor 43, thereby also presenting a smooth external appearance to the coupling.

The second-mentioned internally splined coupling member is adapted to form a lubricant reservoir for the coupling and is provided with openings for replenishing the lubricant supply, and these openings are closed by drain plugs 50 and 51. Agitators are formed on each of the engagement members 28 and 29 as flanges 52 and 53 which are serrated or toothed about their outer periphery at 54 and 55, and these agitators are adapted to extend into lubricant in the lubricant reservoir formed by the outer coupling member for creating a lubricant fog on rotation of the coupling. Lubricant is adapted to be supplied to the space around these agitators through metering openings 56 and 57 formed in flanges 58 and 59 of the outer coupling member. These flanges 58 and 59 are arranged on each side of the agitator members and act as baffles to prevent the supply of too large an amount of lubricant to the agitators which would impair their proper operation. The lubricant fog which is created by the rotation of the serrated edges of the agitators 52 and 53 is adapted to be drawn through the bearings 24 and 25 by a centrifugal fan action which is created by openings 60 and 61 formed in the coupling members 16 and 17. Thus, lubricant fog formed by the agitators is drawn through the antifriction bearings and is expelled outwardly into the lubricant reservoir where it condenses and is again recirculated by the metering openings to the space about the agitators. The inner splined coupling members which secure together the inner shafts 10 and 11 also are lubricated by the lubricant fog through a similar centrifugal action which is provided by openings 62 and 63 formed in the inner coupling member 36. The circulation of lubricant fog through these splined connections is exactly the same as through the ball bearings and minimizes wear between the engaging splined surfaces. To equalize the level of lubricant in both parts of the coupling, passages 64 are formed in the arbor 43 and passages 65 in the coupling member 39 to provide equalizing communications between all parts of the coupling and to assure lubrication of the splines 22 and 41. In this manner, we provide for the efficient lubrication and connection of oppositely rotating pairs of oppositely extending shafts.

While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States is:

1. A coupling for connecting a pair of inner and outer substantially co-axial shafts extending in one direction to another pair of inner and outer substantially co-axial shafts extending in the opposite direction including a pair of engagement members respectively secured to each of said inner shafts, means including a coupling member arranged in engagement with said engagement members for providing a driving connection between said inner shafts, a second pair of engagement members respectively secured to each of said outer shafts, means including a second coupling member surrounding said first-mentioned coupling member and arranged in engagement with said second engagement members for providing a driving connection between said outer shafts, and a means including a pair of anti-friction bearings respectively positioned between each of said inner shafts and said second engagement members for supporting said inner shafts, said second coupling member being formed as a lubricant reservoir for said bearings, each of said second engagement members having a plurality of outwardly extending openings adjacent said bearings for creating a centrifugal fan action on rotation of said coupling whereby lubricant is drawn through said bearings.

2. A coupling for connecting a pair of inner and outer substantially co-axial shafts extending in one direction to another pair of inner and outer substantially co-axial shafts extending in the opposite direction including a pair of engagement members respectively secured to each of said inner shafts, means including a coupling member arranged in engagement with said engagement members for providing a driving connection between said inner shafts, a second pair of engagement members respectively secured to each of said outer shafts, means including a second coupling member surrounding said first-mentioned coupling member and arranged in engagement with said second engagement members for providing a driving connection between said outer shafts, means including a pair of anti-friction bearings respectively positioned between each of said inner shafts and said second engagement members for supporting said inner shafts, said coupling member being formed as a lubricant reservoir for said bearings, and means extending into lubricant in said reservoir for creating a lubricant fog on rotation of said coupling, each of said second engagement members having a plurality of outwardly extending openings adjacent said bearings for creating a centrifugal fan action on rotation of said coupling whereby lubricant fog is drawn through said bearings.

3. A coupling for connecting a pair of inner and outer substantially co-axial shafts extending in one direction to another pair of inner and outer substantially co-axial shafts extending in the opposite direction including a pair of engagement members respectively secured to each of said inner shafts, means including a coupling member arranged in engagement with said engagement members for providing a driving connection between said inner shafts, a second pair of engagement members respectively secured to each of said outer shafts, means including a second coupling member surrounding said first-mentioned coupling member and arranged in engagement with said second engagement members for providing a driving connection between said outer shafts, means including a pair of ball bearings respectively positioned between each of said inner shafts and said second engagement members for supporting said inner shafts, said second coupling member being formed as a lubricant reservoir for said bearings, and means including a pair of agitator members respectively secured to one shaft of each of said pair of shafts adjacent said bearings and arranged to extend outwardly into lubricant in said lubricant reservoir for creating a lubricant fog on rotation of said coupling, each of said second engagement members having a plurality of outwardly extending openings adjacent said bearings for creating a centrifugal fan action on rotation of said coupling whereby lubricant fog is drawn through said bearings.

4. A coupling for connecting a pair of inner and outer substantially co-axial shafts extending in one direction to another pair of inner and outer substantially co-axial shafts extending in the opposite direction including a pair of externally splined engagement members respectively secured to each of said inner shafts, means including an internally splined coupling member arranged in engagement with said engagement members for providing a driving connection between said inner shafts, a second pair of externally splined engagement members respectively secured to each of said outer shafts, means including a second internally splined coupling member surrounding said first-mentioned coupling member and arranged in engagement with said second engagement members for providing a driving connection between said outer shafts, means including a pair of ball bearings respectively positioned between each of said inner shafts and said second engagement members for supporting said inner shafts, said second coupling member being formed as a lubricant reservoir for said bearings, and means including a pair of agitator members respectively secured to one shaft of each of said pair of shafts adjacent to said bearings and arranged to extend outwardly into lubricant in said lubricant reservoir for creating a lubricant fog on rotation of said coupling, each of said second engagement members having a plurality of outwardly extending openings adjacent said bearings for creating a centrifugal fan action on rotation of said coupling whereby lubricant fog is drawn through said bearings.

5. A coupling for connecting a pair of inner and outer substantially co-axial shafts extending in one direction to another pair of inner and outer substantially co-axial shafts extending in the opposite direction including a pair of engagement members respectively secured to each of said inner shafts, means including a coupling member arranged in engagement with said engagement members for providing a driving connection between said inner shafts, a second pair of engagement members respectively secured to each of said outer shafts, means including a second coupling member surrounding said first-mentioned coupling member and arranged in engagement with said second engagement members for providing a driving connection between said outer shafts, means including a pair of anti-friction bearings respectively positioned between each of said inner shafts and said second engagement members for supporting said inner shafts, said second coupling member being formed as a lubricant reservoir for said bearings, means including a pair of agitator members respectively secured to one shaft of each of said pair of shafts adjacent said bearings and arranged to extend outwardly into lubricant in said lubricant reservoir for creating a lubricant fog on rotation of said coupling, and means for metering the supply of lubricant to the space around said agitator members, each of said second engagement members having a plurality of outwardly extending openings adjacent said bearings for creating a centrifugal fan action on rotation of said coupling whereby lubricant fog is drawn through said bearings.

6. A coupling for connecting a pair of inner and outer substantially co-axial shafts extending in one direction to another pair of inner and outer substantially co-axial shafts extending in the opposite direction including a pair of engagement members respectively secured to each of said inner shafts, means including a coupling member arranged in engagement with said engagement members for providing a driving connection between said inner shafts, a second pair of engagement members respectively secured to each of said outer shafts, means including a second coupling member surrounding said first-mentioned coupling member and arranged in engagement with said second engagement members for providing a driving connection between said outer shafts, means including a pair of bearings respectively positioned between each of said inner shafts and said second engagement members for supporting said inner shafts, said second coupling member being formed as a lubricant reservoir for said bearings, means extending into said lubricant reservoir for creating a lubricant fog on rotation of said coupling, and means including a baffle having metering openings therethrough arranged on each side of each of said lubricant fog creating means for supplying lubricant to the space around said lubricant fog creating means, each of said second engagement members having a plurality of outwardly extending openings adjacent said bearings for creating a centrifugal fan action on rotation of said coupling whereby lubricant fog is drawn through said bearing.

7. A coupling for connecting a pair of inner and outer substantially co-axial shafts extending in one direction to another pair of inner and outer substantially co-axial shafts extending in the opposite direction including a pair of externally splined engagement members respectively secured to each of said inner shafts, means including an internally splined coupling member arranged in engagement with said engagement members for providing a driving connection between said inner shafts, a second pair of externally splined engagement members respectively secured to each of said outer shafts, means including a second internally splined coupling member surrounding said first-mentioned coupling member and arranged in engagement with said second engagement members for providing a driving connection between said outer shafts, means including a pair of ball bearings respectively positioned between each of said inner shafts and said second engagement members for supporting said inner shafts, said second coupling member being formed as a lubricant reservoir for said bearings, means including a pair of agitator members respectively secured to one shaft of each of said pair of shafts adjacent said bearings and arranged to extend outwardly into lubricant in said lubricant reservoir for creating a lubricant fog on rotation of said coupling, and means including a baffle with metering openings therethrough arranged on each side of each of said agitator members for supplying lubricant to the space around said agitator members, each of said second engagement members having a plurality of outwardly extending openings adjacent said bearings for creating a centrifugal fan action on rotation of said coupling whereby lubricant fog is drawn through said bearings.

8. A coupling for connecting a pair of inner and outer substantially co-axial shafts extending in one direction to another pair of inner and outer substantially co-axial shafts extending in the opposite direction including a pair of externally splined engagement members respectively secured to each of said inner shafts, means including an internally splined coupling member arranged in engagement with said engagement members for providing a driving connection between said inner shafts, a second pair of externally splined engagement members respectively secured to each of said outer shafts, means including a second internally splined coupling member surrounding said first-mentioned coupling member and arranged in engagement with said second engagement members for providing a driving connection between said outer shafts, means including a pair of anti-friction bearings respectively positioned between each of said inner shafts and said second engagement members for supporting said inner shafts, said second coupling member being formed as a lubricant reservoir for said bearings, means extending into said lubricant reservoir for creating a lubricant fog on rotation of said coupling, and means including a baffle with metering openings therethrough arranged on each side of each of said agitator members for supplying lubricant to the space around said agitator members, each of said second engagement members having a plurality of outwardly extending openings adjacent said bearings for creating a centrifugal fan action on rotation of said coupling whereby lubricant fog is drawn through said bearings, and means for equalizing the lubricant level throughout said coupling.

9. A coupling for connecting a pair of inner and outer substantially co-axial shafts extending in one direction to another pair of inner and outer substantially co-axial shafts extending in the opposite direction including a pair of externally splined engagement members respectively secured to each of said inner shafts, means including an internally splined coupling member arranged in engagement with said engagement members for providing a driving connection between said inner shafts, a second pair of externally splined engagement members respectively secured to each of said outer shafts, means including a second internally splined coupling member surrounding said first-mentioned coupling member and arranged in engagement with said second engagement members for providing a driving connection between sai outer shafts, means including a pair of anti-friction bearings respectively positioned between each of said inner shafts and said second engagement members for supporting said inner shafts, said second coupling member being formed as a lubricant reservoir for said bearings, means including a pair of agitator members respectively secured to one shaft of each of said pair of shafts adjacent said bearings and arranged to extend outwardly into lubricant in said lubricant reservoir for creating a lubricant fog on rotation of said coupling, and means including a baffle with metering openings therethrough arranged on each side of each of said agitator members for supplying lubricant to the space around said agitator members, each of said second engagement members having a plurality of outwardly extending openings adjacent said bearings for creating a centrifugal fan action on rotation of said coupling whereby lubricant fog is drawn through said bearings.

JOHN A. MAUL.
WILLIS P. LAUTZENHEISER.

REFERENCES CITED

The following references are of record in the file of this patent:

UNITED STATES PATENTS

| Number | Name | Date |
| --- | --- | --- |
| Re. 21,843 | Smith et al. | June 24, 1941 |
| 1,724,902 | Bentley | Aug. 20, 1929 |
| 1,865,088 | Daun et al. | June 28, 1932 |
| 1,959,905 | Couch | May 22, 1934 |
| 1,978,209 | Kuhns | Oct. 23, 1934 |
| 2,242,262 | Ray | May 20, 1941 |
| 2,305,454 | Nallinger et al. | Dec. 15, 1942 |

FOREIGN PATENTS

| Number | Country | Date |
| --- | --- | --- |
| 548,128 | Great Britain | 1942 |